(12) United States Patent
Puharre et al.

(10) Patent No.: US 10,664,930 B2
(45) Date of Patent: May 26, 2020

(54) DEVICE FOR POWERING AN ELECTRICAL APPLIANCE

(71) Applicant: Orange, Paris (FR)

(72) Inventors: Michel Puharre, Chatillon (FR); Fabien Cherbourg, Morsang sur Orge (FR)

(73) Assignee: ORANGE, Paris (FR)

( * ) Notice: Subject to any disclaimer, the term of this patent is extended or adjusted under 35 U.S.C. 154(b) by 397 days.

(21) Appl. No.: 15/120,387

(22) PCT Filed: Feb. 13, 2015

(86) PCT No.: PCT/FR2015/050362
§ 371 (c)(1),
(2) Date: Aug. 19, 2016

(87) PCT Pub. No.: WO2015/124854
PCT Pub. Date: Aug. 27, 2015

(65) Prior Publication Data
US 2017/0061554 A1 Mar. 2, 2017

(30) Foreign Application Priority Data
Feb. 21, 2014 (FR) ..................................... 14 51427

(51) Int. Cl.
*G06Q 50/06* (2012.01)
*H02J 7/00* (2006.01)
(Continued)

(52) U.S. Cl.
CPC ........... *G06Q 50/06* (2013.01); *G06Q 20/145* (2013.01); *G06Q 30/04* (2013.01); *G07F 15/006* (2013.01);
(Continued)

(58) Field of Classification Search
CPC ...... G06Q 50/06; G06Q 20/145; G06Q 30/04; H02J 50/80; H02J 7/0047; H02J 7/0052; G07F 15/006
See application file for complete search history.

(56) References Cited

U.S. PATENT DOCUMENTS 5,349,535 A * 9/1994 Gupta ................... H01M 10/48
702/63
5,583,418 A * 12/1996 Honda .................. B60L 53/305
320/109
(Continued)

FOREIGN PATENT DOCUMENTS

WO 2009012018 A2 1/2009
WO WO-2009012018 A2 * 1/2009 ............ B60L 3/0092
(Continued)

OTHER PUBLICATIONS

Salman, E., & Friedman, E. G. (2012). High Preformance Integrated Circuit Design. New York: The McGraw-Hill Company. p. 264-267. (Year: 2012).*
(Continued)

*Primary Examiner* — Peter Ludwig
*Assistant Examiner* — Michael Jared Walker
(74) *Attorney, Agent, or Firm* — David D. Brush; Westman, Champlin & Koehler, P.A.

(57) ABSTRACT

The present invention relates to a device allowing the electrical powering of an electrical appliance, having a remote control module allowing the activation of the electrical supply of the electrical appliance and allowing the reception of messages, the device including means for detecting the connection of the electrical appliance, the detection of the connection triggering a phase of electrical powering of the electrical appliance for a first duration, and, on receipt of a message during the first duration, maintaining
(Continued)

the electrical supply of the electrical appliance beyond the first duration.

13 Claims, 3 Drawing Sheets

(51) Int. Cl.
 *H02J 50/80* (2016.01)
 *G06Q 30/04* (2012.01)
 *G06Q 20/14* (2012.01)
 *G07F 15/00* (2006.01)
(52) U.S. Cl.
 CPC .............. *H02J 7/00* (2013.01); *H02J 7/0047* (2013.01); *H02J 50/80* (2016.02)

(56) References Cited

U.S. PATENT DOCUMENTS

| | | | | |
|---|---|---|---|---|
| 7,745,954 B1* | 6/2010 | Menas | ................ | G06F 1/266 307/38 |
| 7,847,706 B1* | 12/2010 | Ross | ................ | G08C 17/02 340/12.52 |
| 7,960,944 B2* | 6/2011 | Hoffman | ................ | H02J 3/14 320/107 |
| 8,010,812 B2* | 8/2011 | Forbes, Jr. | ................ | G01D 4/004 713/300 |
| 8,093,861 B2* | 1/2012 | Christensen | ................ | B60L 3/0046 320/109 |
| 2003/0112570 A1* | 6/2003 | Koida | ................ | H02H 3/08 361/93.9 |
| 2006/0119368 A1* | 6/2006 | Sela | ................ | G01R 19/2513 324/522 |
| 2007/0063808 A1* | 3/2007 | Darr | ................ | H01H 9/104 337/143 |
| 2008/0067876 A1* | 3/2008 | Nitsche | ................ | H01H 47/002 307/326 |
| 2009/0312883 A1* | 12/2009 | Myllymaki | ................ | H02J 3/14 700/293 |
| 2010/0065344 A1* | 3/2010 | Collings, III | ................ | B60L 53/11 180/2.1 |
| 2010/0131117 A1* | 5/2010 | Mattiocco | ................ | G06Q 10/06 700/295 |
| 2010/0306033 A1* | 12/2010 | Oved | ................ | G06Q 10/06375 705/7.37 |
| 2010/0332308 A1* | 12/2010 | Yap | ................ | G06Q 20/204 705/14.34 |
| 2011/0018679 A1* | 1/2011 | Davis | ................ | H02J 7/025 340/3.1 |
| 2011/0050447 A1* | 3/2011 | Tedesco | ................ | G08B 13/1427 340/687 |
| 2011/0213983 A1* | 9/2011 | Staugaitis | ................ | H02J 3/14 713/176 |
| 2012/0080944 A1* | 4/2012 | Recker | ................ | H02J 9/02 307/25 |
| 2012/0098428 A1* | 4/2012 | Koppelaar | ................ | H05B 37/0272 315/52 |
| 2013/0123998 A1* | 5/2013 | King | ................ | G06F 1/30 700/292 |
| 2013/0137376 A1* | 5/2013 | Fitzgerald | ................ | H04B 5/0056 455/41.3 |
| 2013/0200841 A1* | 8/2013 | Farkas | ................ | H02J 7/0042 320/107 |
| 2013/0305066 A1* | 11/2013 | Mullins | ................ | G06F 1/266 713/310 |
| 2017/0061554 A1* | 3/2017 | Puharre | ................ | G06Q 50/06 |

FOREIGN PATENT DOCUMENTS

| | | | | |
|---|---|---|---|---|
| WO | 2013123988 A2 | 8/2013 | | |
| WO | WO-2013123988 A2 * | 8/2013 | ............ | H04W 12/06 |

OTHER PUBLICATIONS

USB.org, USB 2.0 Specification, https://web.archive.org/web/20171203144114/http://www.usb.org/developers/docs/usb20_docs/ (Year: 2017).*

International Search Report dated Apr. 23, 2015 for corresponding International Application No. PCT/FR2015/050362, filed Feb. 13, 2015.

Written Opinion of the International Searching Authority dated Apr. 23, 2015 for corresponding International Application No. PCT/FR2015/050362, filed Feb. 13, 2015.

French Search Report and Written Opinion dated Sep. 22, 2014 for corresponding French Application No. FR1451427, filed Feb. 21, 2014.

English translation of the Written Opinion of the International Searching Authority dated Aug. 23, 2016 for corresponding International Application No. PCT/FR2015/050362, filed Feb. 13, 2015.

* cited by examiner

DEVICE FOR POWERING AN ELECTRICAL APPLIANCE

CROSS-REFERENCE TO RELATED APPLICATIONS

This application is a Section 371 National Stage application of International Application No. PCT/FR2015/050362, filed Feb. 13, 2015, the content of which is incorporated herein by reference in its entirety, and published as WO 2015/124854 on Aug. 27, 2015, not in English.

TECHNICAL FIELD OF THE INVENTION

The present invention relates generally to the field of units for supplying power to electrical devices and, more specifically, that of power supply units allowing electrical devices to be supplied with power while allowing this power supply to be billed.

TECHNOLOGICAL BACKGROUND

Access to electrical sockets for charging the battery of, or supplying electrical power to, an electrical device is currently often either non-existent or free in public places such as hotels, stations, trains, airports, etc.

In the first case, this is a real problem for users who need to charge electrical devices such as their smartphones, tablets or laptop computers.

In the other case, the problem of the cost of the power thus offered to users for free arises, without forgetting the cost of maintaining the electrical sockets. It is necessary then to have a method or a unit to be able to bill for the service of charging the electrical device.

This issue arises, for example, in the case of charging electric vehicles, and solutions proposing charging points available to the general public exist. Such a solution is, for example, described in the international patent application PCT/EP2012/053032. The system described in this patent application allows the electrical power used when charging an electric vehicle to be billed. This system makes it possible to identify the vehicle to be charged and to bill for the charging operation. The described solution is complex, however, and depends on standardized communication between the charging point and the vehicle via e.g. a CAN (Controller Area Network, ISO 11898) bus on board the vehicle.

Another solution is presented, for example, in the American patent application US2010332308. Such a solution makes it possible to bill for the charging operation, the owner of the smartphone being able to make the payment directly by e.g. bank card over a payment terminal installed beside the charging point. This system has the drawback of depending on the addition of a payment terminal, thereby substantially increasing the cost of such an installation, not to mention the costs involved in maintaining such payment terminals.

Other solutions exist, making it possible to identify electrical devices and to bill for the charging of these electrical devices, such as e.g. the Smart Energy Solutions system proposed by Sony™. This solution may however not be applied to existing electrical device pools without obliging each user to use a specific charging cable, e.g. integrating an NFC-type chip in order to identify the electrical device or its user.

It will also be noted that all of the charging solutions depending on the electrical device to be charged playing an active role become inoperable if the battery of the device is fully discharged. This is the case, for example, of the solution presented in the international patent application PCT/EP2012/053032. This is a major drawback of these solutions.

SUBJECT OF THE INVENTION

The invention proposes to overcome the aforementioned drawbacks by means of a unit allowing an electrical device to be supplied with electrical power, having a remote-control module allowing the supply of electrical power to the electrical device to be activated and allowing messages to be received, the unit comprising means for detecting the connection of the electrical device, the detection of the connection triggering a phase of supplying electrical power to the electrical device for a first duration and, on receiving a message in the first duration, maintaining the supply of electrical power to the electrical device beyond the first duration.

Advantageously, it is therefore possible to connect a fully discharged electrical device, i.e. one whose battery is empty, or even an electrical device having no battery, whether or not this is the normal operating state of the electrical device, to this electrical power supply unit. Thus, the supply of power to this electrical device for the first duration allows the battery of the electrical device to be sufficiently charged or simply to be supplied with power so that the user is able to use the electrical device. Thus, a process of activating the electrical power supply unit, i.e. starting to provide a supply of electrical power to the electrical device connected to the unit, depending on the use of this same electrical device, is made possible by the present invention, even if the connected electrical device is initially discharged.

At the same time, the invention makes it possible to avoid electrical devices being connected to the unit without the process of activating the unit being carried out by the user of the electrical device. Specifically, beyond the first duration, on failing to have received a message, the unit cuts the supply of electrical power to the connected electrical device.

The invention therefore allows the use of an electrical device to manage the activation of a power supply unit to be reconciled with the fact that this same electrical device may need to be supplied with power to be usable.

According to one embodiment of the present invention, the unit comprises a female electrical socket allowing the electrical device to be connected by plugging in.

Advantageously, in order to guarantee a high level of compatibility with the electrical devices that exist on the market, the unit allows electrical devices to be connected via a female electrical socket.

According to another embodiment of the present invention, the unit comprises a wireless power transmission system allowing the electrical device to be connected via a wireless power transmission technology.

Advantageously, so as not to deal with the various charging cables that exist on the market and which are specific to each electrical device, the unit allows electrical devices to be connected via a wireless power transmission system, e.g. via the Qi technology developed by the Wireless Power Consortium.

According to one embodiment, the received message is a validation message comprising a parameter indicating that the supply of power to the electrical device must be maintained beyond the first duration.

Advantageously, the validation message comprises a parameter indicating to the unit that it must not cut the supply of power to the electrical device once the first duration has expired. Thus, the unit is informed that the supply of power to the connected electrical device must be maintained beyond the first, free, duration, as, for example, billing for the service may correctly be ensured by a server from which the validation message originates.

According to an alternative embodiment, the remote-control module allows messages to be received and sent and the unit comprises means for detecting the disconnection of the electrical device, measuring at least one parameter linked to the phase of supplying power to the electrical device and sending a message containing at least the measured parameter.

Advantageously, the unit may detect the disconnection of the electrical device, indicating that the power supply phase has ended, measure a parameter linked to this power supply phase and send this parameter to a server which will be able to use this parameter to ensure that the service is billed for. This may be e.g. the power consumed in the power supply phase.

According to an additional embodiment, the measured parameter is the duration of the phase of supplying power to the electrical device.

Advantageously, in order to simplify the billing of users for a power supply service based on the unit, the measured parameter is the time of the power supply phase. The user of the service may therefore easily be billed according to the time for which the service is used.

According to another embodiment, the unit comprises a means for, on failing to receive a message in the first duration, deactivating, for a second duration, the supply of power to the electrical device as well as the detection of the connection of an electrical device.

Advantageously, in order to avoid a user being able to commit fraud, the unit enters a blocking phase, the detection of the connection of, and the supply of power to, an electrical device being blocked, on expiration of the first duration. This makes it possible to avoid a user being able, at the end of the first duration, to simply disconnect then reconnect an electrical device in order to take advantage of a new free power supply phase (for a new first duration) in this way without having to activate the unit. The benefit of such a method of defrauding is highly limited if the unit is blocked after a first power supply phase without activation of the unit. The duration of the second duration in each power supply phase cycle without activation could be advantageously increased in order to reinforce this dissuasive effect.

The invention also proposes a system comprising a unit allowing an electrical device to be supplied with electrical power and a server. The unit has a remote-control module allowing the supply of electrical power to the electrical device to be activated and allowing messages originating from the server to be received. The unit comprises means for detecting the connection of the electrical device, the detection of the connection triggering a phase of supplying electrical power to the electrical device for a first duration and, on receiving a message in the first duration, maintaining the supply of electrical power to the electrical device beyond the first duration. The server comprises means for sending messages to the unit.

According to an additional embodiment, the invention proposes a system in which the unit allowing an electrical device to be supplied with electrical power allows messages originating from the server to be received and messages destined for the server to be sent and the server comprises means for sending messages to the unit and receiving messages originating from the unit.

According to an additional embodiment, the invention proposes a system also comprising an electrical device that is able to be connected to the unit in order for electrical power to be supplied thereto and which has means for sending messages destined for the server and receiving messages originating from the server.

According to an additional embodiment, the messages exchanged between the electrical device and the server are of short message type.

Advantageously, a user having an electrical device that is able to transmit and receive short messages, e.g. messages of Short Message Service (SMS) type, which is the case with practically all mobile telephones or smartphones, or even tablets, present on the market, will be able to use a service for providing an electrical power supply comprising the unit of the present invention. Specifically, the service may be activated by sending an SMS, thereby making activation simple and compatible with most terminals. In particular, this does not require any sort of application to be developed and subsequently installed by the user on the electrical device. This therefore also reduces the costs of developing a service implementing the present invention.

The invention also proposes a method allowing an electrical device to be supplied with electrical power, the method being executed by the electrical power supply unit, the method comprising the steps of detecting the connection of an electrical device, triggering the supply of power to the electrical device for a first duration and, on receiving a message in the first duration, maintaining the supply of electrical power to the electrical device beyond the first duration.

In practice, the method allowing an electrical device to be supplied with electrical power according to the invention is implemented in the form of a computer program, this program being executed, for example, by a processor of a unit allowing an electrical device to be supplied with electrical power. Consequently, according to a final aspect, a subject of the present invention is a computer program comprising program instructions for the implementation of all or part of the steps of a method allowing an electrical device to be supplied with electrical power such as briefly disclosed above, when this program is executed by a processor.

Additionally, a computer program according to the invention may use any programming language, and take the form of source code, object code, or of code intermediate between source code and object code, such as in a partially compiled form, or in any other desirable form.

Another aim of the invention is therefore an information recording medium readable by a computer, and comprising instructions of a computer program according to the invention. Such a recording medium may be formed by any entity or unit capable of storing such a program. For example, the medium may comprise a storage means, such as a ROM (read-only memory)-type memory, for example a CD ROM or a microelectronic circuit ROM, or else a removable recording means such as a USB key or a magnetic recording means, such as a hard disk. On the other hand, a software module or program according to the invention may, in particular, be downloaded to an Internet-type network. The advantages offered by a computer program, such as briefly defined above, are identical or contribute to those mentioned above in relation to the method allowing an electrical device to be supplied with electrical power according to the invention, and will therefore not be recalled here.

DETAILED DESCRIPTION

Figure 1A:
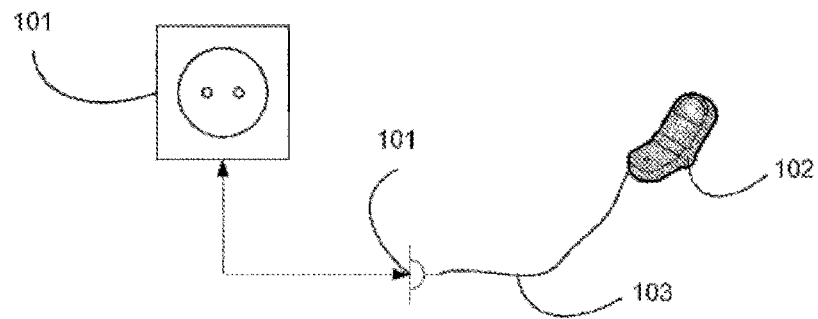
FIG. 1A shows a unit allowing an electrical device to be connected for the purpose of supplying power thereto or charging it.

FIG. 1A shows an electrical power supply unit such as a female electrical socket conventionally used for allowing an electrical device to be connected via a cable equipped with a male plug. The electrical device is connected then to the electrical power supply unit by plugging in. This same electrical socket is connected to a power source, typically the domestic electrical network (not shown).

Depending on the implementations of the present invention, the power source used may be different. Specifically, it is possible to envisage the power source being a bank of batteries, potentially equipped with a voltage converter. It is also possible to envisage this same bank of batteries being charged by another power source, such as one or more wind turbines, solar panels, or any other power source potentially known to those skilled in the art.

In the rest of the present description, it will be assumed that the power source in question is an AC power source at 220 V, thereby allowing practically all electrical devices, such as mobile telephones or smartphones, tablets or personal computers, to be supplied with power without it restricting the nature of the electrical device to be supplied with power. For the sake of simplification, the phrase "recharging an electrical device" is assumed to mean "recharging the battery of the electrical device".

Thus, FIG. 1A shows a smartphone 102 connected, via a cable 103, to the electrical socket 101. The cable 103 has, on its end on the telephone side, a connector allowing it to be connected to the telephone and, on its end on the electrical socket 101 side, a male electrical plug. Conventionally, an electrical transformer is integrated in the male plug of the cable.

Figure 1B:
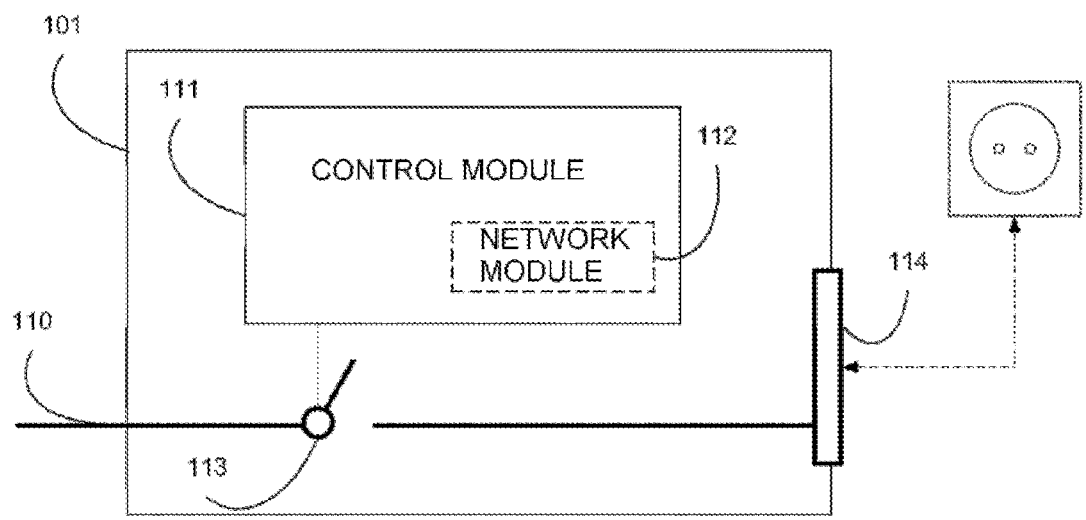
FIG. 1B diagrammatically shows a unit according to one embodiment of the invention.

FIG. 1B diagrammatically shows a unit 101 according to one embodiment of the invention. The unit 101 allows an electrical device connected via a connector 114 to be supplied with electrical power.

The unit 101 may have a connector 114 of female electrical socket type, as illustrated in FIGS. 1A and 1B, a connector 114 of USB connector type or, for example, in the case of using a wireless power transmission technology, a connector 114 suited to this technology.

In one alternative embodiment, the connector 114 may comprise multiple connectors or sub-connectors, each sub-connector advantageously being of a different type. This allows wider compatibility to be offered to the customer, by providing one sub-connector of electrical socket type, another of USB or Mini-USB type, etc. In one simple embodiment, these sub-connectors are integrated within the connector 114 according to an electrical setup referred to as "parallel connection". In another embodiment, a switch present on the connector 114 allows the user to activate a sub-connector of the connector 114 according to his or her choice.

The unit 101 has a remote-control module 111 (referred to hereinafter as a "control module") allowing the supply of electrical power to the electrical device connected via the connector 114 to be activated or deactivated. The electrical power supply connected via the connector 114 may be activated or deactivated on the unit 101 e.g. by using a switch 113 controlled by the control module 111. When this switch 113 is in a closed state, the electrical device is supplied with electrical power. On the other hand, when this switch 113 is in an open state, the supply of electrical power is cut. Stated otherwise, when the switch 113 is in the closed state, the unit 101 is said to be "activated", allowing the connected electrical device to be supplied with electrical power; in the other case, the unit is said to be "deactivated". Only the activated state of the unit 101 allows the connected electrical device to be supplied with electrical power.

Figure 3:
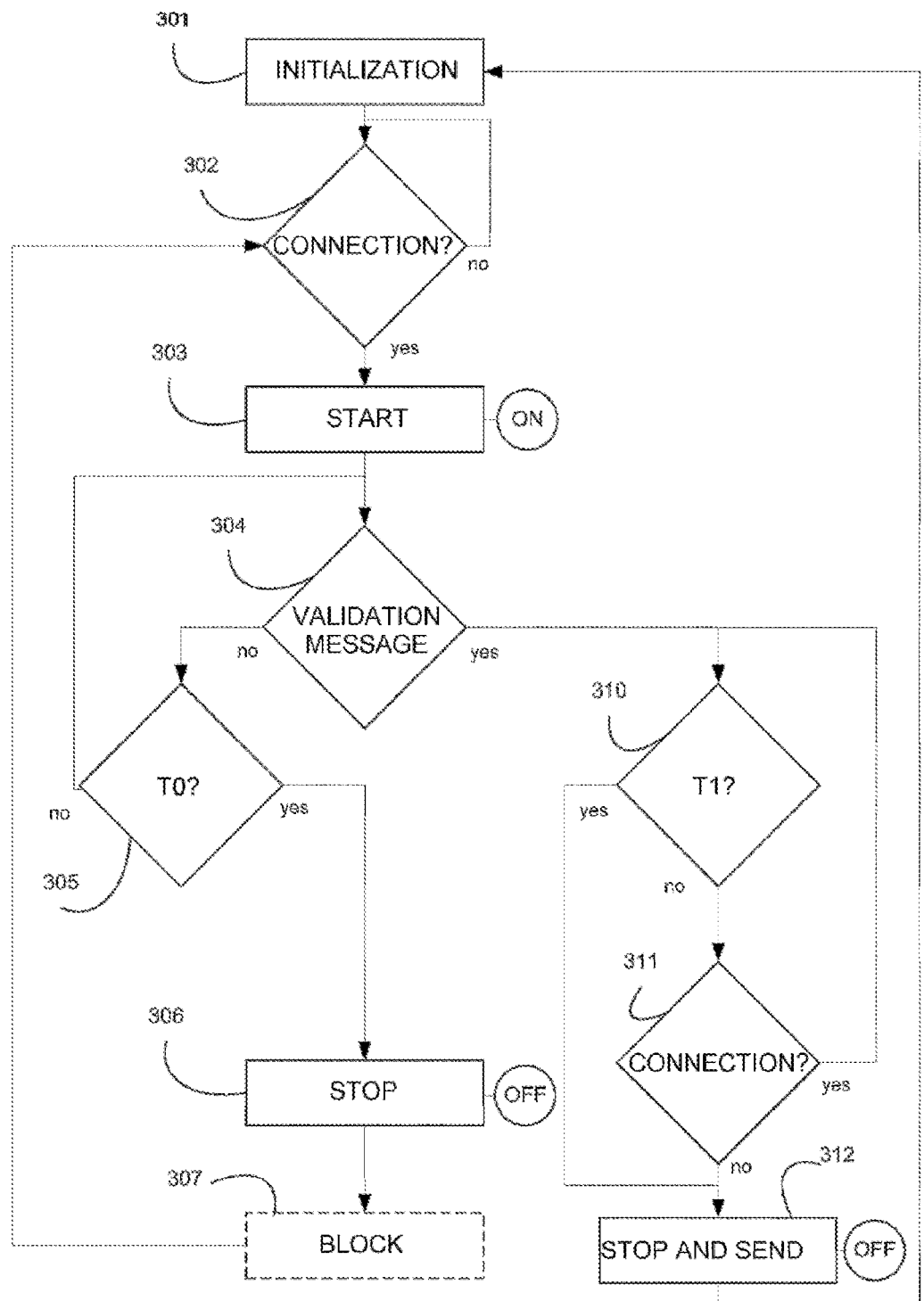
FIG. 3 is a flowchart of the algorithm implemented by the unit for supplying electrical power to an electrical device according to one embodiment of the invention.

The control module 111 also allows messages to be received and/or sent, via a network module 112. Such a network module 112 may, in one embodiment, be integrated in the control module 111. According to one embodiment, the control module has a processor allowing the various modules of the unit 101—network module 112, switch 113, etc.—to be controlled by means of a control algorithm. An example of such a control algorithm is illustrated by FIG. 3 described below.

The control module 111 may also have a memory area, not shown in FIG. 1B. This memory area allows data to be stored, e.g. configuration parameters of the electrical power supply unit 101, but also any other necessary data.

The network module 112 may use network technologies of any type, such as e.g. an Ethernet, Wi-Fi, GPRS, 3G, 4G, powerline communication (PLC) or any other network technology network module. This network module allows messages to be received and/or sent, e.g. short messages of SMS type or any other type of message depending on the network technology used.

The unit 101 is connected to an electrical power source via, for example, a connection 110 to the domestic electrical network. In one embodiment, this electrical power source supplies power to the control module 111 and any other module integrated in the unit 101.

According to one embodiment, the control module 111 has means for measuring parameters that are linked to the operation of the unit 101. This may be, for example, one or more parameters linked to the phase of supplying power to the electrical device, such as the duration of the power supply phase, the power consumed during the power supply phase, etc. In particular, these measuring means may be used by the unit 101 for detecting the connection or disconnection of an electrical device, e.g. by measuring the current passing through the unit 101.

According to one embodiment of the invention, an identifier is affixed beside the unit 101 so as to be visible to users of the system. This identifier may be linked to the geographic location of the unit 101. According to one embodiment, the identifier of a unit 101 is stored in a database of a server and is associated with a network address, such as an Internet Protocol (IP) address, corresponding to the network module 112 of the control module 111 of the unit 101. This association may be recorded in a billing server, which will be described below.

According to one additional embodiment, the unit 101 comprises one or more indicator lights, e.g. light-emitting diodes (LEDs), that are visible to a user and which allow a state of the unit 101 to be displayed. These states are, for example: in power supply phase, power supply cut, problem detected in the unit 101, activation not detected or in progress, imminent expiration of a period, etc.

According to another additional embodiment, the unit 101 comprises a screen visible to a user, allowing messages that are intended to be read by users to be displayed and displaying, for example, information on the state of the unit 101.

Figure 2:
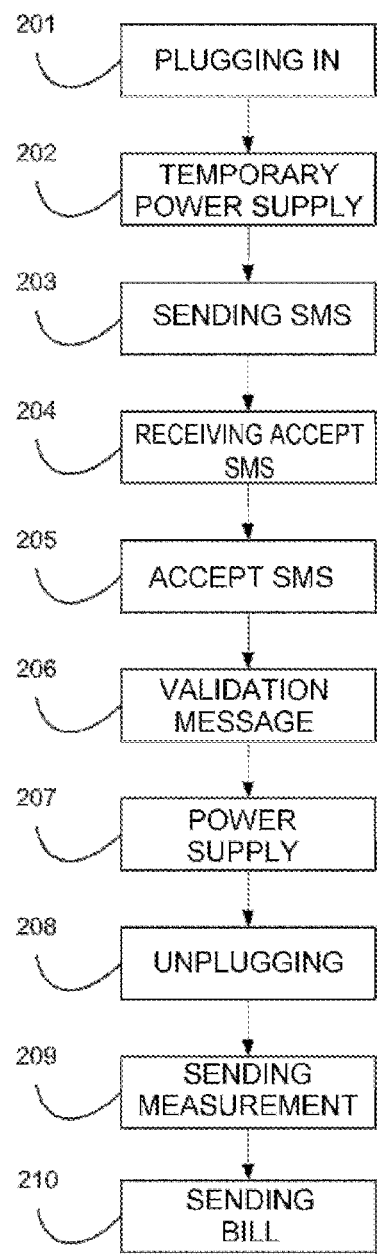
FIG. 2 is a flowchart illustrating the implementation of the invention according to one embodiment.

FIG. 2 is a flowchart illustrating the implementation of the invention according to one particular embodiment. This figure describes the user experience of a service of charging a user's electrical device, the charging service using the unit 101.

Specifically, it is becoming increasingly apparent that the service of charging an electrical device is a service that is particularly valued by users of electrical devices such as smartphones, which have limited autonomy. It may therefore seem wise for a telecommunications operator to provide this type of service. It then becomes important for this telecommunications operator to achieve at least two objectives. First of all, that of being able to monitor billing for the service. Subsequently, it is important to offer this service without adding to the complexity of billing for the end user. Stated otherwise, it is necessary to be able to easily monitor billing for the charging service and integrate billing for the charging service into the operator's billing system with which the user is already familiar.

It therefore appears advantageous to propose a solution that is both simple and immediately usable for the end user, requiring no modification of electrical devices or purchase of additional equipment in order to be used, but also allowing, for example, a telecommunications operator to provide a service for which billing can be easily integrated into the existing billing so that the user has a clear and simple picture of the service. The proposed solution using the unit 101 as a charging point makes this possible. It also makes it possible to reduce the costs of a charging point in order to allow a billing service for charging an electrical device to have improved financial viability even though the electrical power consumed represents low amounts.

The electrical device in question here is typically a mobile telephone, or any item of electronic equipment comprising a telephony module that is able to receive and send messages such as e.g. SMS. In this example, the electrical device has a battery that it is proposed to charge via the service described.

The system put in place in order to offer the charging service discussed below comprises the unit 101 described above, as well as at least one server, referred to as a billing server.

The server, depending on the embodiment, may exchange messages with the unit 101 via a communication channel that is compatible with the network module 112 used by the unit 101.

In the example described below, this server may also send and receive short messages of SMS type, in particular destined for and originating from the electrical device in question.

According to one embodiment, the server is, for example, operated by a telecommunications operator. An advantage of this is to allow billing for the charging service to be integrated into billing for telecommunications services that are already offered by the operator.

The server has a database enabling billing, the database in particular comprising data allowing the identifier affixed to the unit 101 to be associated with the network address of the module 112 of this same unit 101.

In a first step 201, the user connects the electrical device to the connector 114 of the unit 101. As described in step 302 of FIG. 3, this triggers the electrical power supply phase, allowing the battery of the connected electrical device to be charged.

If the user does nothing more, only one temporary electrical power supply phase, for a first duration, is available, which corresponds to step 202. The supply of electrical power to the device is subsequently cut on expiration of this first duration. In order to limit fraud, this step, depending on the embodiments, is followed by a period in which the unit 101 is blocked. This blocking prevents, in particular, an electrical device connected to the unit 101 on expiration of the first duration being supplied with electrical power for a second duration. The user may therefore not take advantage of another electrical power supply phase for a new first duration immediately after the first duration.

The first duration is defined, in the proposed service, as having the following objective: in the event of a discharged device being connected, sufficient time is allowed for charging the battery of the connected electrical device to a minimum amount and thus having means for sending and receiving SMSs required for the activation of the service.

Thus, in a step 203, when the electrical device is sufficiently charged, the user may use it to send a first SMS to the telephone number shown on a sign affixed close to the unit 101, or known to the user by another means, the first SMS also comprising the identifier of the unit 101 which is also affixed close to the unit 101 and is read off by the user. SMSs sent to this telephone number are transmitted to the billing server. The objective of this first SMS is to command the activation of the unit 101 beyond the first duration.

On receiving this first SMS, the billing server sends a second SMS to the user's electrical device, reminding him or her of the general terms and conditions of sale and use of the service and asking him or her for confirmation of his or her activation request. This second SMS is received by the user's device in step 204.

In return, in step 205, the user of the electrical device sends a third SMS to the billing server, confirming the request to activate the unit 101.

Once the third confirmation SMS has been received, the billing server searches through its database for the network address corresponding to the identifier of the unit 101 that was included in the first SMS requesting activation of the unit. The server may send a fourth SMS to the user's electrical device. This fourth SMS indicates that the response has indeed been acknowledged and may also indicate, for example, a maximum permitted duration for charging the user's electrical device, which duration corresponds to a third duration explained below.

In step 206, the server, having found the network address of the unit 101 corresponding to the received identifier in its database, sends a validation message to the unit 101 comprising a parameter indicating that the supply of power to the electrical device must be maintained beyond the first duration.

In step 207, the unit 101, having received the validation message, supplies electricity to the electrical device until the latter is disconnected or a third duration expires, as explained below in the description of step 310 of FIG. 3.

In step 208, the user subsequently ends the phase of charging the device by disconnecting the electrical device from the connector 114. Alternatively, depending on the chosen embodiment, when the third duration has expired, the unit 101 ends charging.

In a step 209, the unit 101 sends a message to the billing server comprising a parameter indicating that the power supply phase has been interrupted. According to one embodiment, this message comprises a parameter measured by the unit 101 during the electrical power supply phase. Advantageously, the measured parameter corresponds to the duration of the power supply phase if the objective is to bill for the service according to the charging duration.

The billing server, receiving this message, is able to calculate the tariff for the effected power supply phase, and may integrate this tariff into the telephone bill of the user of the electrical device. It will be noted that the electrical device is identified by its call number when the SMSs are received by the billing server.

The billing server is able to send, in a step 210, a fifth SMS summarizing the billing for the service provided to the user's electrical device.

FIG. 3 is a flowchart of the algorithm implemented by the unit 101 according to one embodiment of the invention.

The algorithm shown below may ideally be implemented in the form of a computer program, which program is executed by a processor that is integrated, for example, in the control module 111 of the unit 101 allowing an electrical device to be supplied with electrical power.

In a first initialization step 301, the unit 101 starts up. This may correspond to its powering up, for example on connecting the unit 101 to a power source, such as an electrical network, via the connector 110. Depending on the embodiment, the unit may also be restarted subsequent to receiving a restart message comprising a restart command. When starting, the unit 101 may reset to a default state, e.g. by opening or closing the switch 113. Likewise, data stored in a memory area of the control module 111 may be wiped or reset to default values. For example, measured parameters, a time counter or any other parameter may be reset to zero.

In step 302, the unit 101 detects the connection of an electrical device. Depending on the embodiment and, more specifically, on the nature of the connector 114, the connection, and hence the detection of the connection, may be achieved by various methods.

In the case in which the connector 114 is of female electrical socket type, the connection may be detected when, for example, a male plug is detected in the electrical socket 114, thereby requiring the unit to be equipped with a special detector for carrying out this role. Alternatively, assuming that the switch 113 is placed by default in a closed state, ie. that the power supply is activated by default, detection may be achieved by detecting a charging current or a variation in voltage, or any other parameter that reveals that an electrical device has been connected to a socket. These methods are transferable to any type of connector 114 operating on a principle of complementary female sockets/male plugs, such as a connector 114 of USB socket type.

In the case in which the connection of an electrical device has not been detected, the unit 101 awaits the detection of a connection. Step 302 is a loop of waiting for the detection of a connection.

In a step 303, after detecting the connection of an electrical device, a phase of supplying electrical power to the electrical device is triggered by the unit 101 for a first duration. Depending on the default state of the unit 101, the control module 111 will close the switch 113 in order to trigger this phase of supplying power to the connected electrical device.

The first duration may correspond to a predetermined duration, e.g. five minutes. According to another embodiment, this first duration may be modified, either, for example, by reconfiguring the unit 101 or, for example, via a control unit integrated in the unit 101. This first duration may also be calculated or adjusted according to parameters measured during the connection of the electrical device. For example, by increasing the first duration if measurement indicates that the electrical device consumes little current, i.e. less current than a certain predefined value that is referred to as "low" this value possibly being parameterizable, or, conversely, by reducing the first duration if the electrical device consumes a lot (i.e. more than a predefined value that is referred to as "high", this value possibly being parameterizable). In one embodiment, the first duration is proportional to the consumption of the connected electrical device. In another embodiment, the first duration is variable, depending on e.g. the time of day or a parameterization received via one or more messages.

In steps 304 and 305, the unit 101 will maintain the supply of electrical power to the connected device for the first duration (referred to as "T0" in FIG. 3, step 305), while verifying the potential reception of a message (step 304).

Thus, in step 304, on receiving a validation message in the first duration, the supply of electrical power to the electrical device is maintained beyond the first duration T0, and the unit 101 moves on to steps 310 and 311. This validation message corresponds to the SMS sent by the billing server during step 206 of FIG. 2.

The measurement of the first duration T0 may be made by triggering a countdown in step 303, subsequent to the detection of an electrical device being connected. Alternatively, in step 305, the unit 101 may compare the timestamp of step 303 with the current time of the unit. More specifically, this means comparing the result of the difference between these two times, thus defining a first elapsed duration, with the first duration T0, in order to determine whether the first duration T0 has been reached. As long as the first elapsed duration is shorter than the first duration T0 and no validation message has been received, steps 304 and 305 are repeated in a loop.

According to one embodiment, a message received by the unit 101 allows the unit 101 to be validated and activated beyond the first duration T0. Stated otherwise, a validation message received in the first duration T0 allows the supply of electrical power to the electrical device via the unit 101 to be maintained beyond this first duration T0.

According to one additional embodiment, the received message is a validation message comprising a parameter indicating that the supply of power to the electrical device must be maintained by the unit 101 beyond the first duration T0.

In step 305, if the first elapsed duration turns out to be longer than the first duration T0, the unit 101 moves on to step 306 and then step 307.

In step 306, the unit 101 cuts the supply of electrical power to the electrical device.

The following step 307 is an optional step. If step 307 is carried out, the unit 101 deactivates the supply of electrical power to the electrical device, as well as the detection of the connection of an electrical device, for a second duration T2. This step 307 is of course carried out only failing the reception of a message in the first duration (step 304).

The objective of this step 307 is to reduce instances of fraud by making fraud more complicated or tedious. Specifically, if no validation message is received in the first duration T0 (step 304), the unit 101 is blocked. Thus, in this blocking step 307, the supply of electrical power to the electrical device is cut and it is no longer possible, for the second duration T2, to connect or reconnect an electrical device to the unit 101 in order to take advantage of a new electrical power supply phase for a first duration T0. This therefore prevents a user from taking advantage of a succession of free electrical power supply phases by disconnecting and then reconnecting an electrical device from/to the unit 101. This is particularly advantageous with a view to billing for a service of supplying electrical power to an electrical device using the unit 101 of the present invention.

According to one additional embodiment, the second duration T2 may be variable, e.g. depending on a parameter received in a configuration message. It is also possible to increase it—either continuously or not—depending, for example, on the number of power supply phases that might have successively elapsed without any validation message having been received. The effect of this would be to reinforce the onerousness and limit the benefit of attempting to commit fraud by successively disconnecting and reconnecting an electrical device from/to the unit 101. A second predetermined duration may thus be added to the second duration T2, or otherwise the second duration T2 may e.g. be doubled, each time step 306 is reached. According to this embodiment, a validation message received in step 304 will then have the effect of resetting the second duration T2 to its initial value.

Depending on the embodiment, if step 307 is not implemented, the following step is step 302. A disconnection followed by a reconnection of the electrical device from/to the unit 101 then allows the process described in FIG. 3 to be relaunched from step 302.

Assuming that a validation message, i.e. a message comprising a parameter indicating that the supply of power to the electrical device must be maintained beyond the first duration T0, is received, the unit 101 moves on to steps 310 and 311. This phase of supplying power to the electrical device is referred to as "in validated mode", in contrast to the preceding power supply phase in which there had been no validation. The maximum duration of this preceding phase is limited to the first duration T0. In an identical manner, the duration of the phase of supplying power to the electrical device in "validated" mode, i.e. once a validation message has been received in step 304, may, depending on the embodiment, be limited to a third duration (referred to as "T1" in step 310 of FIG. 3).

Likewise, this power supply phase in "validated" mode is ended when the electrical device connected to the connector 114 is disconnected, which corresponds to step 311.

Step 310, which is optional, is a check that the "validated" electrical power supply phase has not exceeded the third duration T1. With a view to billing for the service provided by the unit 101, e.g. billing according to the duration of the power supply phase, this allows the maximum charging time, and hence the maximum sum that is billed for one charge, to be limited. Just like the first duration T0, the third duration T1 may be adjusted or modified according to the same modalities.

According to one embodiment, a second elapsed duration may be measured either from the connection of the electrical device (step 302) or from the reception of the validation message (step 304). In the first case, this second elapsed duration is the same as the first elapsed duration used previously in step 305. Whatever the choice of starting point for the second elapsed duration, it is compared to the third duration T1. If the second elapsed duration is longer than the third duration T1, the unit moves on to step 312. Otherwise the unit moves on to step 311.

Step 311 corresponds to the detection of the disconnection of the electrical device previously connected to the unit 101. Detecting disconnection is achieved using a method similar to that for detecting connection. If no disconnection of the electrical device is detected, the unit 101 executes step 310 anew.

Thus, as long as no disconnection of the connected electrical device is detected and the third duration T1 is not exceeded, the phase of supplying electrical power to the electrical device connected to the unit 101 continues.

On the other hand, after detecting the disconnection of the device or after the third duration T1 has been exceeded, the unit 101 moves on to step 312.

In step 312, the supply of electrical power to the electrical device is cut or deactivated. The control module 111 controls, for example, the opening of the switch 113.

In this same step 312, the unit 101 may send a message containing at least the measured parameter. Advantageously, the message is sent to a billing server, the message comprising a measured parameter. This measured parameter is used by the billing server for billing for the power supply service provided by the unit 101. This message may additionally comprise an identifier associated with the unit 101. In order to make it possible to bill for the service according to the duration of use, the measured parameter is the duration of the phase of supplying power to the electrical device. In the case in which the message comprises no measured parameter, the billing server may calculate the elapsed duration between sending the validation message, corresponding to the validation message received by the unit 101 and detected in step 304, and receiving the message sent by the unit 101 in step 312 in order to determine a power supply phase duration to be billed.

Subsequent to step 312, the unit 101 may, as illustrated in FIG. 3, undergo a reset. The effect of this reset may be that the parameters of the unit 101 are reset to zero or that the data stored in the memory area of the unit 101 are wiped. Alternatively, the unit 101 may return to step 302, awaiting the detection of the connection of a new electrical device.

Although the present disclosure has been described with reference to one or more examples, workers skilled in the art will recognize that changes may be made in form and detail without departing from the scope of the disclosure and/or the appended claims.

The invention claimed is:

1. A unit allowing an electrical device to be supplied with electrical power, the unit comprising:
   a switch;
   a remote-control module including a processor configured to control the switch to control a supply of electrical power to the electrical device and receive messages; and
   a non-transitory computer-readable medium comprising a computer program stored thereon comprising program instructions which, when executed, cause the unit to perform acts of:
      detecting a connection of the electrical device, the detection of the connection triggering a phase of supplying electrical power to the electrical device for a first duration using the remote-control module and the switch;
      maintaining the supply of electrical power to the electrical device using the remote-control module and the switch beyond the first duration on receiving a validation message during the first duration, wherein said validation message being sent by a server in response to a message commanding the activation of said unit beyond the first duration sent by said electrical device; and deactivating said supply of electrical power to the electrical device using the remote-control module and the switch on failing to receive said validation message during the first duration.

2. The unit as claimed in claim 1, comprising a female electrical socket allowing the electrical device to be connected by plugging in.

3. The unit as claimed in claim 1, comprising a wireless power transmission system allowing the electrical device to be connected via a wireless power transmission technology.

4. The unit as claimed in claim 1, said validation message comprising a parameter indicating that the supply of power to the electrical device must be maintained beyond the first duration.

5. The unit as claimed in claim 1, the remote-control module configured to send and receive messages, the acts including:
detecting a disconnection of the electrical device;
measuring at least one parameter linked to a phase of supplying power to the electrical device;
sending a measurement message containing at least the measured parameter.

6. The unit as claimed in claim 5, the measured parameter being a duration of the phase of supplying power to the electrical device.

7. The unit as claimed in claim 1, wherein the acts include, on failing to receive said validation message during the first duration, deactivating, for a second duration, said supply of power to the electrical device as well as the detection of the connection of an electrical device.

8. A system comprising:
a server configured for sending messages to a unit; and
the unit, which allows an electrical device to be supplied with electrical power, the unit including a remote-control module configured to control a switch to control a supply of electrical power to the electrical device and receive messages originating from said server, the unit further comprising:
a processor; and
a non-transitory computer-readable medium comprising a computer program stored thereon comprising program instructions which, when executed, cause the unit to perform acts of:
detecting a connection of the electrical device, the detection of the connection triggering a phase of supplying electrical power to the electrical device for a first duration using the remote-control module and the switch;
maintaining the supply of electrical power to the electrical device using the remote-control module and the switch beyond the first duration on receiving a validation message during the first duration, wherein said validation message being sent by the server in response to a message commanding the activation of said unit beyond the first duration sent by said electrical device; and
deactivating said supply of electrical power to the electrical device using the remote-control module and the switch on failing to receive said validation message during the first duration.

9. The system as claimed in claim 8, wherein:
the acts include sending messages destined for the server; and
the server is configured to receive the messages originating from the unit.

10. The system as claimed in claim 9, comprising the electrical device, which is configured to be connected to the unit in order for electrical power to be supplied thereto, and is configured to send messages destined for the server and receive messages originating from the server.

11. The system as claimed in claim 10, wherein the messages exchanged between the electrical device and the server being of short message type.

12. A method for supplying electrical power to an electrical device, the method being executed by a unit allowing said electrical device to be supplied with electrical power, which device includes a remote-control module and a switch, the method comprising acts of:
detecting a connection of the electrical device;
triggering a supply of power to the electrical device for a first duration using the remote-control module and the switch;
maintaining the supply of electrical power to the electrical device using the remote-control module and the switch beyond the first duration on receiving a validation message during the first duration, wherein said validation message being sent by a server in response to a message commanding the activation of said unit beyond the first duration sent by said electrical device; and
deactivating said supply of electrical power to the electrical device using the remote-control module and the switch on failing to receive said validation message during the first duration.

13. A non-transitory computer-readable medium comprising a computer program stored thereon comprising program instructions for implementation of a method supplying electrical power to said electrical device, when this program is executed by a processor of a unit including a remote-control module and a switch, wherein the instructions configure the unit to perform acts of:
detecting a connection of the electrical device;
triggering a supply of power to the electrical device for a first duration using the remote-control module and the switch; and
maintaining the supply of electrical power to the electrical device using the remote-control module and the switch beyond the first duration on receiving a validation message during the first duration, wherein said validation message being sent by a server in response to a message commanding the activation of said unit beyond the first duration sent by said electrical device; and
deactivating said supply of electrical power to the electrical device using the remote-control module and the switch on failing to receive said validation message during the first duration.

* * * * *